United States Patent [19]
Rosenberg

[11] Patent Number: 6,088,392
[45] Date of Patent: Jul. 11, 2000

[54] BIT RATE CODER FOR DIFFERENTIAL QUANTIZATION

[75] Inventor: Jonathan David Rosenberg, Morganville, N.J.

[73] Assignee: Lucent Technologies Inc., Murray Hill, N.J.

[21] Appl. No.: 08/865,648

[22] Filed: May 30, 1997

[51] Int. Cl.[7] .................................................. H04N 7/12
[52] U.S. Cl. .......................... 375/240; 348/405; 348/416; 348/420
[58] Field of Search ..................................... 348/415, 422, 348/390, 400–403, 409–413, 416, 420, 699; 375/240; 382/199, 232, 236, 238, 248, 250, 251; H04N 7/12

[56] References Cited

U.S. PATENT DOCUMENTS

| | | | |
|---|---|---|---|
| 5,231,484 | 7/1993 | Gonzales | 348/405 |
| 5,426,463 | 6/1995 | Reininger | 348/405 |
| 5,602,594 | 2/1997 | Cho | 348/419 |
| 5,638,125 | 6/1997 | Jeong | 348/405 |
| 5,745,178 | 4/1998 | Hartung | 348/405 |
| 5,790,745 | 8/1998 | Sugiyama | 386/111 |
| 5,870,145 | 2/1999 | Yada | 348/405 |

*Primary Examiner*—Richard Lee

[57] ABSTRACT

A feed-forward bit-rate control system that selects and formats DQUANT values in real time for optimal semantically-encoded image transmission by video-compression codecs complying with the ITU-T standards H.263 or H.263E. The system uses a prequantization process to reduce the computational load imposed by the quantizer optimization calculations required for feed-forward semantic coding bit-rate control. The H.263 CBPY and MCBPC coding tables are reordered so as to be indexed using an orthogonal flag-based index values and the RLA coding table is block-indexed using clipped amplitude values, for faster access into these tables. The system also uses a rate-assist process to assure that DQUANT values are provided in each edge macroblock that follows a transition to and from each semantically-defined region when the edge macroblocks have four motion vectors by reducing the number of motion vectors in the macroblock to one.

12 Claims, 6 Drawing Sheets

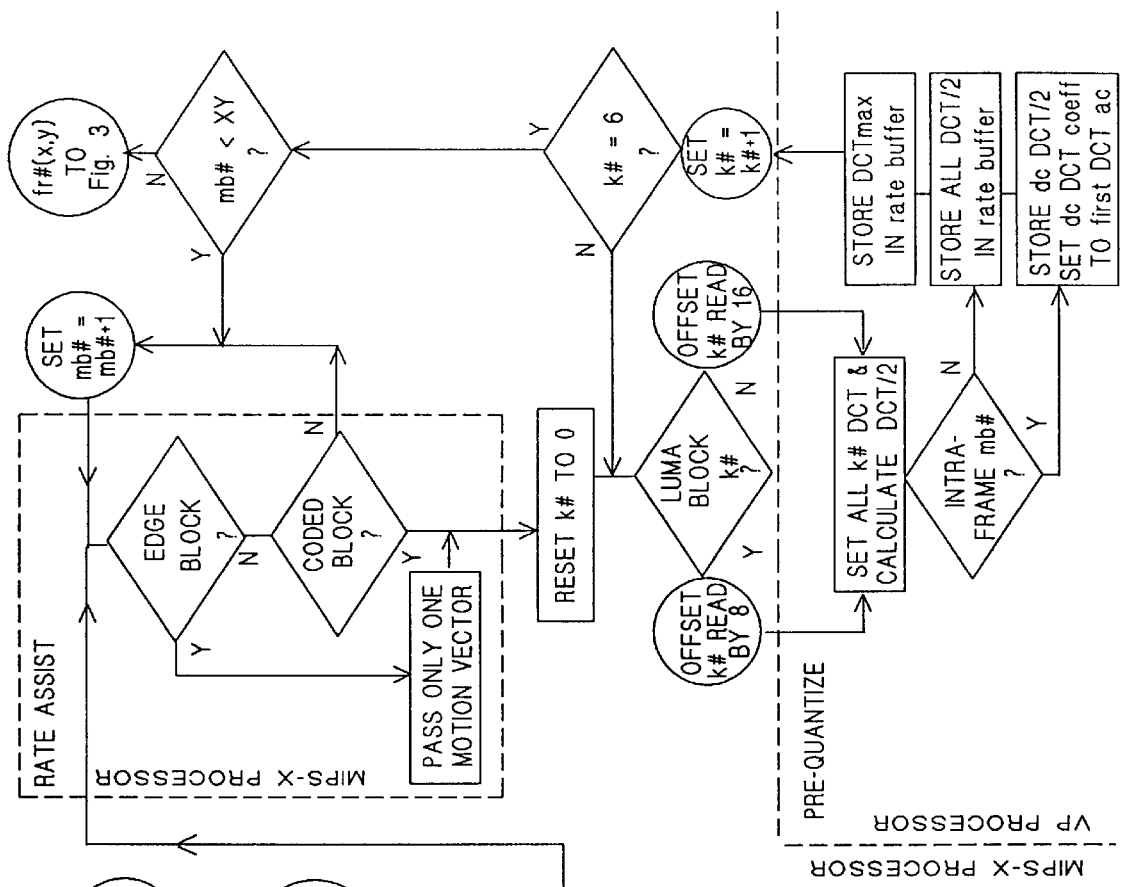
Fig. 2 FRAME INITIALIZATION

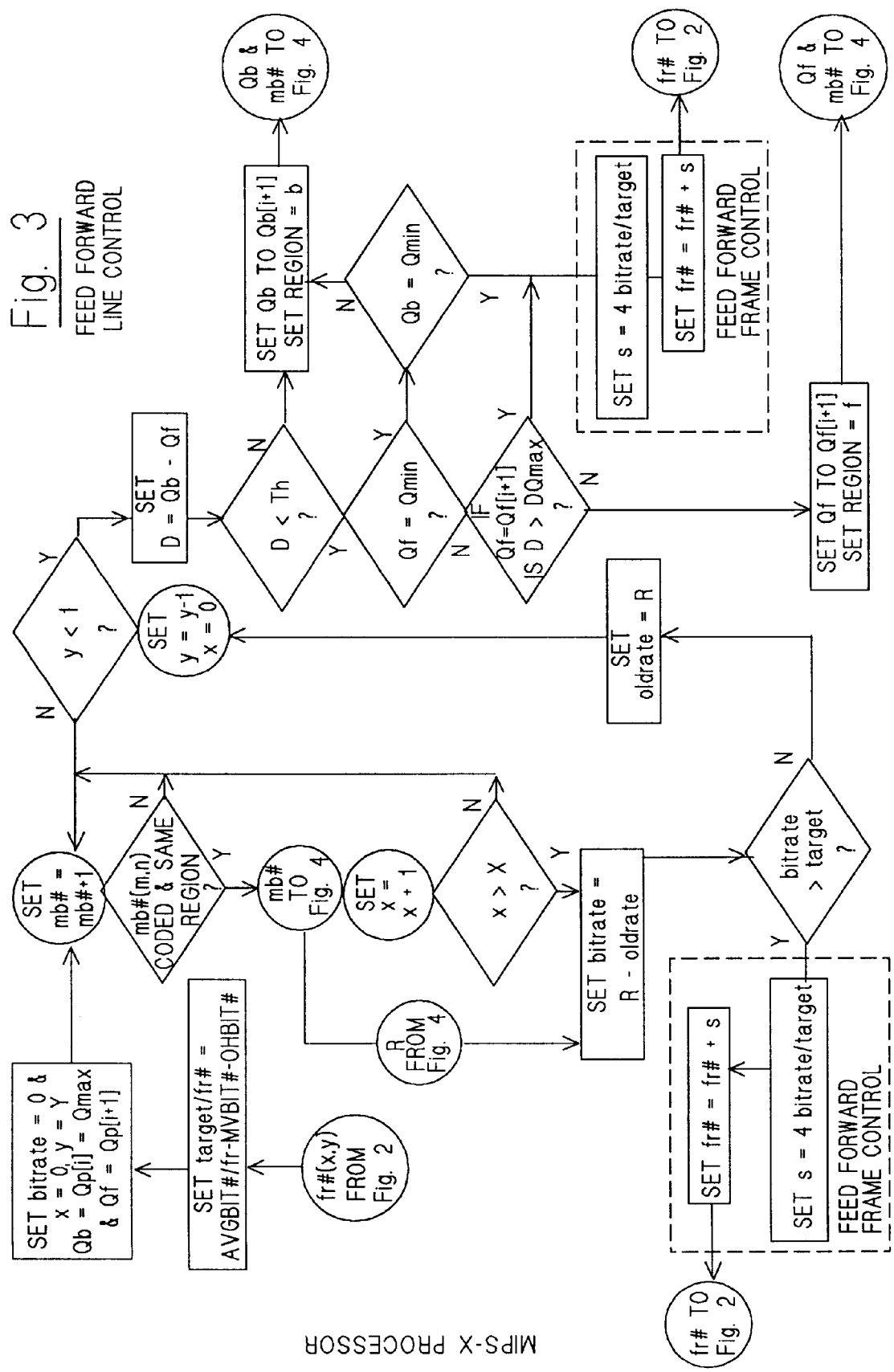

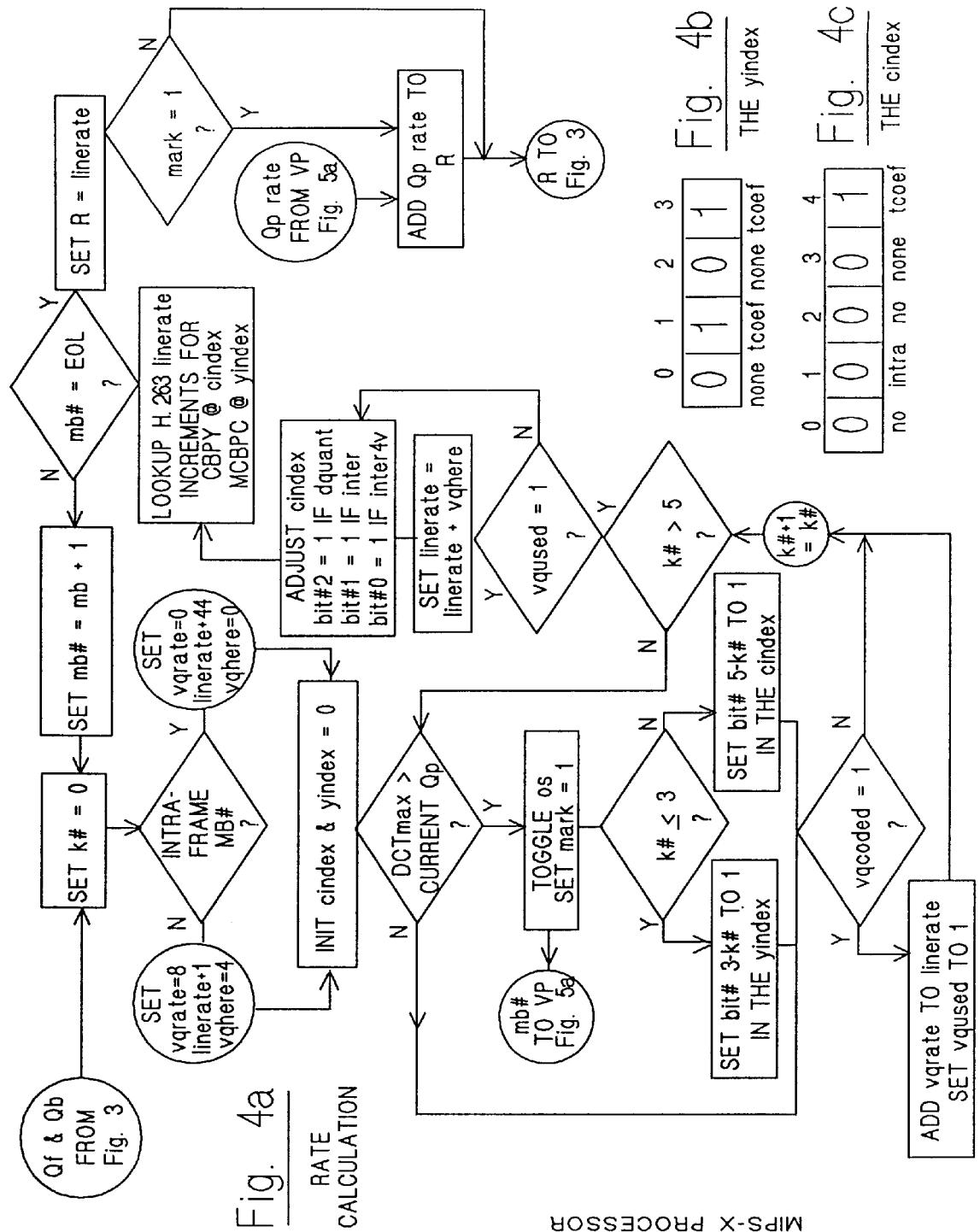

DCT CLIPPER

BIT RATE CODER FOR DIFFERENTIAL QUANTIZATION

BACKGROUND OF THE INVENTION

1. Field of the Invention

The invention is broadly directed to methods and apparatus for adapting variable-rate bitstreams to fixed-rate channels. In particular, the invention pertains to output rate control for bitstreams that are compression-coded in real time.

2. Discussion of Related Art

Feed-forward rate control is advantageous for adapting the encoded variable-rate signals output by video compressors to the fixed-rates required by video transmission channels. This feed-forward control sets the transmitted bit rate a priori, rather than relying on feedback signals reporting the condition of an output buffer from which codec's signal is transmitted. However, feed forward rate control has seldom been used in practical devices, because conventional feed-forward rate control is implemented as a bit-allocation optimization process that uses computationally costly linear-programming methods.

The advantage of a priori rate setting is the greater accuracy it provides, eliminating the slippage produced by the lag inherent in after-the-fact output buffer occupancy determinations. This is particularly advantageous for codecs that provide semantically-determined differential compression of various areas within a video image. Not only does the compressor's current bit rate vary to provide the greater definition required by semantic compression in some areas of an image, the moving average of that bit rate output from that compressor is also likely to vary. Feed-forward control responds more quickly to such rate variations. Thus feed-forward control can eliminate rate errors before the rate errors induced by the variability of differential-compression bit rates can accumulate.

The output or "rate" buffer that holds the encoded signal that is being transmitted by the codec smooths the bit rate of the transmitted signal. Cumulative rate errors impair the codec's ability to maintain an occupancy level in the rate buffer that can provide the desired global bit rate. This rate is an average defined by dividing the channel bit rate by the nominal video frame rate of the video signal. The buffer overflows that occur when image semantics cause the bit rate to momentarily exceed the desired bit rate too much, or to exceed it by only a little but for too long, disrupts image continuity.

Semantic compression also implicitly imposes additional image-quality constraints on a video-compression codec. In particular, errors in high-definition areas of the image become more critical, because better definition has been provided in those areas. For example, when videophone units process the facial areas of "talking head" images, the finer quantization of those facial areas that is needed for perceptual clarity unfortunately also makes the rate errors caused by feedback lag more objectionable in those very same, very important areas.

Compression Standards

The International Telecommunications Union Recommendations (ITU-T No. H.263) specify a compression format for transmitting video images over low bit-rate channels, that is, channels providing only bit rates of 64 kbps or less. Discrete Cosine Transform (DCT) codes are used to encode the pixel luminance and chrominance data for each image frame, and the "motion vectors" compensate for translation motion between adjacent frames. Both are used in the well-known Motion Picture Experts Group (MPEG) standard.

The compression encoding format specified by H.263 is based on segmentation of individual image frames in the video-frame sequence of the incoming video signal into 16×16-pixel (pel) motion-compensation macroblocks. The area of each motion-compensation macroblock coincides with four 8×8-pel DCT-coded image blocks each containing four 8×8-pel luminance-averaging blocks (Y) blocks and with 8×8-pel (U) and (V) chrominance blocks, each corresponding to the entire area of the 16×16-pel macroblock.

The H.263 standard permits the use of Syntax-based Arithmetic Coding (SAC), a more compact alternative to variable-length RLA encoding and "PB-frames" which are a hybrid of the sequentially-predicted P-frames and the bidirectionally-predicted B-frames defined by the MPEG standards, that require a "delta" vector in addition to the one or four motion vectors transmitted for each macroblock. The H.263 standard also defines a table of DQUANT values, a limited set of step sizes between scalar image quantizers applied to the DCT coefficients of each 8×8 coding block, both the AC block-prediction residuals and the DC coefficients of the intraframe luminance-coding blocks. These quantizer step size values or "deltas" define the difference between coding levels used for pixels in macroblocks belonging to different semantic regions in an image frame. The quantized block values are Huffman "entropy" coded for compression, and these Huffman codes and the quantizer step size used for scaling the DCT values of the macroblock are transmitted in the resulting compressed bitstream.

It is widely accepted that Adaptive Vector Quantization (AVQ) using updatable differential scalars in accordance with the H.263 standard, gives H.263 better compression performance than the basic scalar quantization of H.263 or that of CCITT Recommendation H.261. AVQ is superior not only at the very low PSTN bit rates of the public "switched telephone" networks, but even at ISDN rates of 128 kbps and higher on the "integrated data services" networks. According to Shannon rate-distortion theory, such vector-based quantization will always be superior to scalar quantization, so long as the vector-quantizer algorithm used is well-suited to the statistical profile of the signal source. For videophone units, the characteristic source material is "talking heads" and adaptive vector coding is particularly well-suited to the semantics of this relatively homogenous material.

The "Conferencing Codec"

The video encoder/decoder platform (codec) disclosed in the commonly-owned U.S. patent application, Ser. No. 08/727,862, filed Oct. 8, 1996, and the commonly-owned U.S. patent application, Ser. No. 08/500,672, filed Jul. 10, 1995, and incorporated herein by reference is directed toward the compression requirements of a video-conferencing system (the "conferencing codec"). Thus it was not designed for compression-coding video images at the very low PSTN-type bit rates that must be accommodated by 2D codecs used in consumer videophone communications devices, bit rates below 25.6 kbps. Instead, this "conferencing codec" and other 3D codecs used for video-conferencing are designed to transmit over the 128 kbps sub-band channels of the type available on ISDN networks.

The "conferencing codec" uses chrominance tracking and ellipse cross-correlation, supplemented by symmetry detection, for implementing a differential, finer quantization in the "face and hands" areas of each image frame. This "semantic" differential coding process, shown schematically in FIG. 1, is partially frame-independent in that the semantic structure of previous frames is used to provide default values for later frames.

The "conferencing codec" uses a hybrid AVQ/scalar encoding scheme as an alternative to the purely scalar quantizer scheme defined in H.263. This AVQ encoding scheme uses a fixed-size adaptive codebook of 64 different, dimensional codewords to encode macroblocks. The codebook used by the decoder is updated to better match the statistical profile of subsequent frames in a frame sequence using the codes transmitted for each frame. The "conferencing codec" selects the codeword having an index that is closest to the value of each 8×8 DCT-code block from among current codebook entries for each frame, as calculated using sum of the absolute-differences (SAD) of the respective pixel values in the 8×8 block. However, the AVQ residual error is then quantized by the "conferencing codec", using the same step size as the H.263 scalar quantizers use, and entropy coded in the same manner. Thus an equivalent degree of distortion is introduced whenever the scalar and vector residuals are equivalent.

Furthermore, to satisfy Shannon's criterion for efficient VQ coding, each codeword vector should be the centroid of its respective space in the codebook relative to the distribution of the values being coded. Thus, in general, the "conferencing codec" replaces the most infrequently used codeword vectors and the most distorting ones, i.e., codeword vectors having the largest average residual value in their respective frames, with the transmitted scalar-quantizer values. A quality quotient or code-space centroid is independently calculated by each encoder and decoder for each codeword in the current codebook, and used to update the codebook so that it adapts to changes in image semantics. The codebook index of the selected codeword and the scalar quantized value of the residual error value are then entropy encoded.

In the quality-quotient AVQ system, the codebooks are updated by replacing infrequently used codewords having a large average distortion with the scalar-quantized DCT values. The frequency of use and the average distortion of each codeword is recorded. The distortion is the size of, that is, the "energy" in the residue of each vector-quantized value transmitted with each transmitted codebook index value. The usage iteration value is a predetermined value assigned to each codeword when it is inserted in the codebook that is decremented each time it is not used in subsequent frames. In this AVQ system, the codeword having the lowest quotient when that codeword's current usage value is divided by its current average distortion value is replaced.

Alternatively, in the code-space AVQ system, the value of each codeword is replaced by the average of the sum of the current value and each of its residuals in a given frame each time that code word is used in a frame. Thus, for each image frame, each codeword maintained is the current centroid of its partition of codebook's range of values. However, in either updating system, the codeword stored in the current codebook is selected that is the "least distance" away from the DCT block currently being coded. That "least distance" is the sum of the absolute differences between the respective sets of corresponding coefficients for the DCT code and the codeword vector. The residual of that vector quantization (VQ), that same difference between sets, is then scalar-coded by quantization.

Finally, to optimize the overall performance of the video compressor for the current frame in the video sequence, the number of bits used for the H.263 entropy-encoded AVQ vector index and its VQ residual are compared to the number of bits used by the H.263 entropy-encoded scalar-quantized DCT. Bits that encode the pixels in the given block are thus dynamically allocated so that the entropy-coded quantization result requiring the fewest bits is transmitted. However, since the vector's residual value and the scalar, DCT-coded value are both quantized using the same $Q_p$ value, an equivalent distortion is introduced into the vector and the scalar coding paths of this hybrid system.

MFRC Frame Rate Control

The "conferencing codec" also optimizes frame rates so that the image quality provided by the H.623 options is further improved by allowing increased detail in selected frames of the compressed video image, in a hybrid feed-forward CFR/VFR rate control scheme referred to as Model-assisted Frame Rate Control (MFRC).

In CFR bit-rate control, a fixed bit budget "B" for each frame which is stated as bps/fps is allocated to the various areas of the frame by a global COUNTBITS routine. COUNTBITS is a iterative embedded-loop function that determines the number of bits "C" required to encode a frame having respective predicted quantization parameters $Q_i$ and $Q_e$ assigned to the facial and background regions of the current video frame.

To determine suitable values for the predicted $Q_i$ and $Q_e$ quantizers, these parameters are initially assigned low nominal values. If the result is not $C \leq B$. the outer loop first increases $Q_i$ by one or two units and makes $Q_e$ greater than $Q_i$ by a DQUANT value $Q_d$ So that $Q_d = Q_e - Q_i$. If this pair of quantizers does not satisfy $C \leq B$, COUNTBITS then increases $Q_e$ by one or two units iteratively until largest quantizer value $Q_{max}$ is reached. If these values of $Q_e$ do not produce a result C that meets the budget B, the outer loop then increases $Q_i$ by one or two units once again sets $Q_e = Q_i + Q_d$ and tests for $C \leq B$ and iterates the inner and outer loops, until the bit-budget constraint B is satisfied or until $Q_i + Q_d = Q_{max}$ that defines the maximum acceptable degree of quantization coarseness.

The CFR process provides the fixed frame rates needed for maintaining good lip-sync in compressed images, particularly at bit rates below 25.6 kbps, such as those used for videophone applications. The resolution needed in complex-foreground and moving-background frames, however, may make it impossible to reduce the sum C of $Q_i$ and $Q_e$ sufficiently to satisfy the bit budget constraint B merely by using this CFR algorithm because $Q_i + Q_d > Q^{max}$ where $2Q_i + Q_d < B$. If $Q_i + Q_d$ reaches the limit value $Q_{max}$ before the budget constraint value B is satisfied, some type of Variable Frame Rate (VFR) is required.

For the more complex foregrounds, and for moving backgrounds typical of mobile video applications, the global CFR rate control process must be supplemented by a variable frame rate control (VFR) routine that reduces the number of frames actually transmitted in the compressed, nominally 7.5 or 5 fps signal. Frame skipping allows the compressor to accommodate more bits of detail in some transmitted frames than are allowed by the CFR bit budget for those frames. However, a throughput of "x" bps can only be changed in steps x/30 bits-wide where the input frame rate is 30 fps.

Because the frame rate can only be changed by whole frames, the VFR-modified video-image signal must be transmitted through an output buffer that stores more than one frame at once. This permits the buffer's output bit rate to be somewhat independent of its input bit rate, smoothing the coarse x/30 bit adjustment steps. The output buffer's smoothing step adds, at most, a 33-ms delay when the input frame rate is 30 fps.

The VFR routine both modifies the frame-skipping pattern used to reduce the frame rate of the compressed signal and maintains a target buffer occupancy level for the codec such that there is always some unused buffer space and there are always bits available to be transmitted. This margin in the storage space and data available in the buffer prevents discontinuities in the video image, as noted above with reference to differential compression.

Model-assisted Frame Rate Control (MFRC) in the "conferencing codec" uses a constant frame rate whenever the relation between the need for fine quantization in the image and the value of the background coarseness constraint $Q_{max}$ alone satisfy the budget constraint C≦B so that frame rate modification is unecessary.

Unlike conventional schemes in which the quantization level for each macroblock is simply a response to the sensed occupancy level in the output buffer, the MFRC quantizers are assigned to each frame globally. Also, the quantizers vary within that frame according to semantic values, rather than allowing such local quantizer changes to be determined by feedback from the buffer.

Videophone Systems and Image Quality Issues

Video-image frames having a standard rate of 30 fps are compressed and output by the encoders of videophone codecs at a fixed rate of 7.5 or 5 fps. In addition to accommodating these current, very low PSTN bit rates, the consumer-oriented videophone codecs made by different manufacturers must be very flexible, so as to be compatible with each other. This means that they must be operable in real time at a variety of coding rates and input resolution levels, depending on the characteristics of the equipment at the other end of a given transmission line and the communications channels available to the consumer for a given transmission.

Videophone codecs should accommodate the standard CIF (352×288), SIF (360×240), QCIF (176×144), QSIF (180×120) and sub-QCIF (128×96) digital formats and both constant (CFR) or variable frame rate (VFR) coding schemes. To process such diverse signal formats, the codec must be able to select quantizers for VFR global bit-rate allocation consistent with the requirements of a given CFR system.

The constant frame rates of CFR coding in some ways are preferable for coding simple, static background "talking heads" video material at rates above 16 kbps, for the sake of simplicity and efficiency in codec design and operation. However, even at these higher speeds, image quality is degraded by the CFR coding mode when the scene becomes more complex. At very low bit rates the DCT-based compression schemes used by H.263 codecs suffer from two notable types of image degradation caused by coarse quantization: block artifacts and mosquito noise. The block artifacts are square patterns that represent a discontinuity in average intensity across the boundaries between neighboring DCT blocks. These are most objectionable in "flat" areas, areas where there is little detail to camouflage the boundaries of these blocks.

In contrast to the block artifact problem, mosquito noise smears sharp edges and fine detail by overfiltering them. This occurs in systems where images are compressed for low bit-rate transmission without sufficient regard for the semantics-driven variation in the optimal filtering level within each image. The result is artificial-looking facial expressions that lack detail around the eyes and are generally flat in visual texture. To make videophone technology attractive to consumers the system specified by H.263 must be extended to address code-boundary artifacts and the semantics of image content.

The ITU-T H.263 standard for low bit-rate channels, unlike CCITT H.261, limits the difference between the quantizers in adjacent blocks (i) and (i−1), referred to as the DQUANT value, to a list of predetermined of values "D":

$$(Q_p[i]-Q_p[i-1]) \in D$$

A set of four positive and negative DQUANT values is provided in the H.263 standard operating mode. As shown in FIG. 2 a selectable alternative mode may also be provided to implement proprietary enhancements, for example, additional DQUANT values.

The conferencing codec produces a constant bit rate and constant frame rate, so long as that can be achieved, using the maximum quantizer step size consistent with that H.263 constraint on the DQUANT value. This strategy maximizes image detail in areas receiving fine quantization. The conferencing codec also provides semantic prefiltering of the image being coded, and semantic postfiltering on the receiving end, to reduce the smearing and block edge artifacts encountered when images are compressed for transmission.

SUMMARY OF THE INVENTION

In feed forward bit-rate control accordance with the present invention, bit rates for differential quantization of pixel values in first and second semantically-defined regions of each frame in a compression-coded video signal are iteratively calculated line by line. The bit rates are calculated by assigning respective quantizer values for each pass, in numerical order, a calculating a new bit rate for the frame every time a quantizer is changed in a single line. When the bit rate of the frame exceeds a given target value, the frame is transmitted and the frame rate is reduced to compensate.

In another particular embodiment, a pair of quantizer values $Q_b$ and $Q_f$ are selected for each line of macroblocks in a frame from a predetermined set of quantizer values $Q_p$, beginning with the largest values, so that $Q_b$ is never smaller than $Q_f$, and $Q_b-Q_f=DQ$ where DQ is a member of a predetermined set of DQUANT values.

Preferably, the bit rates for each frame are calculated beginning with lines at the lower end of the frame, where the frames contain head-and-shoulders videophone-type images.

Also preferably, the frame rate of the video signal is varied when the maximum quantizer values are too small to provide a bit rate for the frame equal to a given target bit-rate per frame, so that the effective bit rate for a sequence of frames exceeds the given target bit rate per frame. The frame rate of the video signal is also varied when the minimum quantizer values are too large to provide a bit rate for the frame that exceeds the given target bit-rate per frame, so as to insert an additional frame.

Once respective quantizer values have been assigned to the regions and calculated for in all rows of a given frame, if the target rate has not been exceeded, a next lower quantizer value is assigned to one of the regions and a frame rate is then recalculated for each line and checked against the target for the frame as the quantizer is changed in that region.

Preferably, the $Q_b$ value will be the quantizer value that is decreased, unless the next lowest $Q_b$ value is less than the currently assigned $Q_f$ value, in which case the $Q_f$ value is decreased, unless $Q_f$ is already $Q_{min}$, or, where $Q_b-Q_f=D$, the D for the new $Q_f$ will be an illegal DQUANT. This selective change of a single quantizer value assures that the $Q_b$ values in non-facial areas are never lower than the $Q_f$ values in nearby facial areas, which consistently supplies higher resolution in the perceptually-critical skin-color areas, reducing mosquito noise there.

This change of a single quantizer also minimizes the non-uniform quantization that produces block artifacts. In particular, since each change in a quantizer value is done for an entire line at a time, the changes between quantizer values within a line are merely stepwise changes into and out of the macroblocks in respective $Q_b$ and $Q_f$ quantization regions. Also, since only one quantizer value change is made in each iteration of this line-by-line optimization operation and only one region is changed in each iteration, the $Q_b$ values or the $Q_f$ values in adjacent lines differ from each other by only a single quantizer step for one of the two regions and this difference between lines occurs only once in the frame.

Line-by-line optimization eliminates the wasteful repetition of DQUANT codes in each macroblock. Eliminating repetitious DQUANT codes increases the effective resolution of the channel by freeing up code bits for image data. Preferably, DQUANTs are only coded in the edge blocks in each line, blocks located in a given quantization region that follow respective blocks in another quantization region. Thus, bits that would otherwise be used for the DQUANTs of macroblocks within those areas can be used to increase the effective resolution of the channel, because smaller quantizers can be assigned in perceptually critical areas.

Also, because the recalculations for the blocks in an entire row are also addressed to the sequential blocks of bits stored in memory for each row, line-by-line quantizer evaluation can batch process the blocks in each line, which simplifies and speeds up the rate calculation operation.

Changing quantizers for an entire row at a time is even more advantageous in the context of the group-of-blocks (GOB) architecture implemented in systems conforming to the H.263 standard. Any change in quantizer values can be entered once as a GQUANT in the group-of-blocks header for the line where the change occurs to change the quantizer values of all subsequent lines to that value, until the next GQUANT entry.

Preferably, the selection process for H.263 codecs is further expedited by providing directly flag-based indexing into the CBPY and MCBPC coding tables. This provides an orthogonal access route that does not need to first covert macroblock data to the indexing scheme used in the H.263 standard before reading these rate tables.

Also, the quantized pixel values for H.263 codecs are preferably clipped in RLA tokens having a run of zero to a maximum hexadecimal value of sixteen. All other quantized pixel values are clipped to a maximum hexadecimal value of eight. Each non-zero run length in the RLA coding table then has eight places for rapid indexing into the RLA coding table, which speeds up the rate calculation process.

Unlike feed-forward control routines that predict by estimation, guessing, rate control in accordance with the present invention uses the actual number of bits required for the macroblock. This use of actual numbers is preferably implemented using a pre-quantization step that predetermines a coded half-value for the pixels in each block before that block enters the rate control loop. The iterative calculations selecting the optimal $Q_p$ values are then free to operate at high speed, efficiently reusing these predetermined values in each iteration. This very rapid but very exact bit-rate control assures that all possible bits are used for preserving image definition in critical areas at these very low bit rates.

Advantageously, the responsiveness and efficiency of the quantizer selection operation is selectably determined by selecting the number of quantizer values tried. There are only a given number N of possible quantizers tried in the respective regions of the frame, and only Y rows in the frame. Therefore, there can be no more than 2YN iterations M for any image that is coded. Thus, the quantizer selection sequence is self-limiting to a maximum number of iterations M. Many images will require less than half that maximum number M.

By using the largest and next largest predetermined quantizer values first, unlike the "conferencing codec", this codec is able to complete the rate calculation for each frame faster. In a sequence of images, if the largest quantizers $Q[i]=Q_{max}$ and $Q[i+1]$ produce a required number of bits that is greater than the available number of bits, the frame is too high. Thus no other quantizer will be effective, either. In that case, if the image in that frame is coded, as many whole frames must be skipped as is necessary to accommodate the excess bits used by this particular overly complex frame.

Conversely, where the maximum number of iterations M is reached without reaching a required number that is less than the available number by less than the given amount, the frame rate is too low for efficient use of the available bandwidth. However no action is needed and time has been saved because the macroblocks where $DCT_{max}>Q_{max}$ was not found in prequantization will not be entropy coded, saving a substantial amount of calculation time in the "$Q_p$ rate" branch of the rate-control loop.

The present invention uses actual rate calculation to provide feed-forward bit-rate control for improved real-time responsiveness in rate-error control. The use of computational resources in accordance with the present invention is also optimized so as to permit implementation of line-by-line quantization control, thereby preserving image detail lost in global, frame-by-frame quantization. Such responsiveness is important for preventing image discontinuities in high-compression consumer-oriented devices that encode video images for transmission over PSTN channels limited to very low bit rates.

The line-by-line optimization of video compression provides improved image quality for the PSTN channels and also the somewhat higher "low" bit rates available on ISDN network sub-band channels. Thus the invention is advantageous for the high-quality image applications such as video-conferencing over the 128 kbps ISDN channels, where 3D codecs are used, as well as for the high-compression applications having output rates below 25.6 kbps for PSTN videophone communication channels, where 2D codecs are used.

BRIEF DESCRIPTION OF THE DRAWINGS

In the drawings, wherein like reference numerals designate similar elements throughout the several views:

FIG. 2 is a block diagram of the rate-assist and prequantizing steps provided during frame initialization by a 7.5 fps videophone image compression system in accordance with the present invention;

FIG. 3 is a block diagram of line and frame rate control in accordance with the present invention;

FIG. 4a is a block diagram of rate calculation for each line;

FIGS. 4b and 4c show the flag arrays used to access the H.263 MCBPC and CBPY values, respectively, in FIG. 4a;

FIG. 5b illustrates the H.263 RLA coding procedure;

FIG. 5c is a excerpt from the H.263 standard that lists the variable-length codes used to encode RLA tokens; and FIG. 5d shows a portion of the hexadecimal table used by the DCT clipping operation shown in FIG. 5a in accordance with the present invention.

DETAILED DESCRIPTION OF THE PRESENTLY PREFERRED EMBODIMENT

Figure 1:
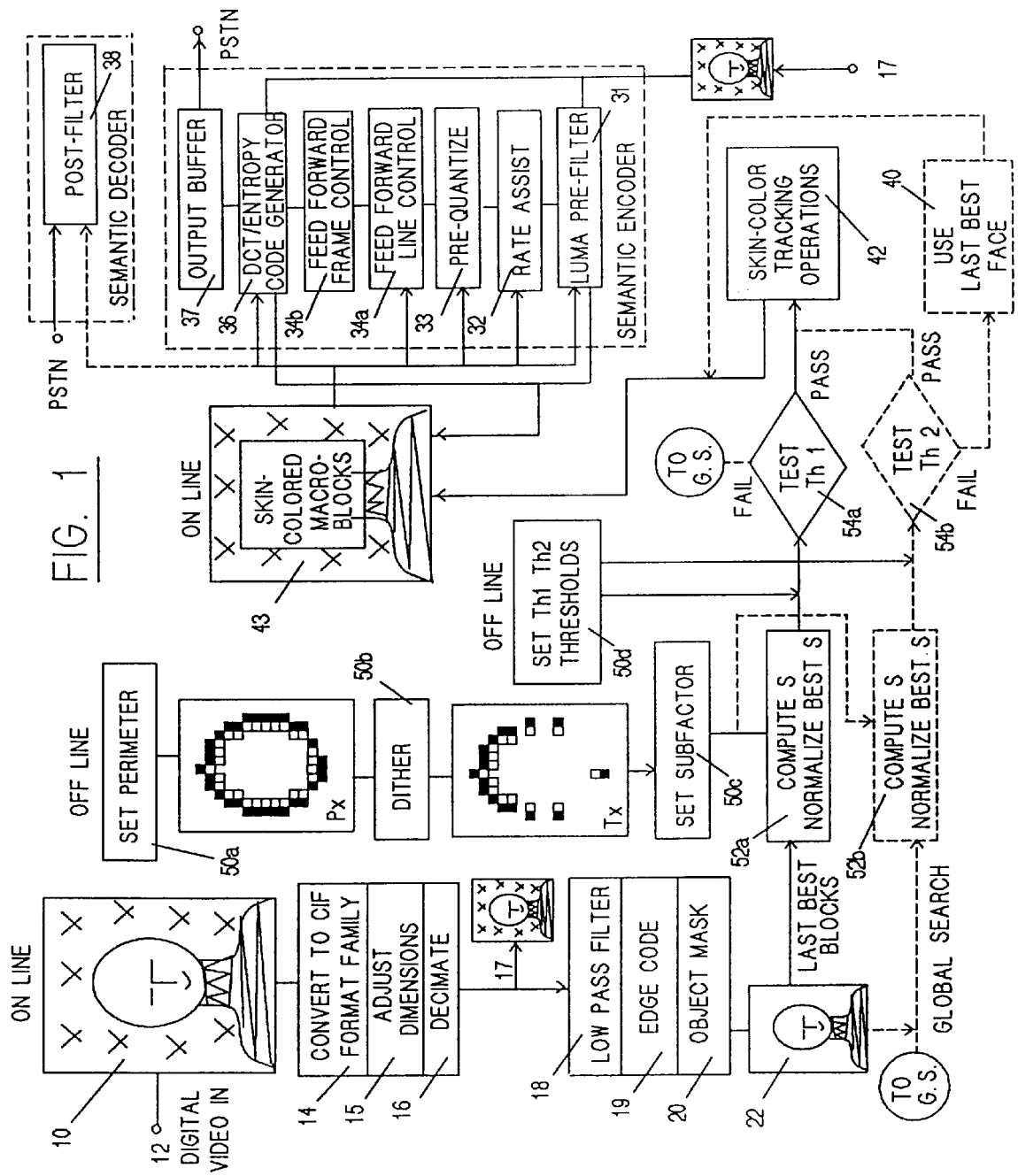
FIG. 1 is a block diagram of a videophone image compression system providing differential quantiziation in accordance with the present invention.

In a H.263-compliant videophone codec in accordance with the present invention, shown in FIG. 1, each video-image frame 10 of an incoming video signal 12 is partitioned into two types of semantically-defined regions: a "facial" region and a "background" region. The "facial" region contains those H.263 macroblocks in the video frame that include skin-colored pixels as illustrated in block 43. The remaining macroblocks in the video frame are in the "background" region.

Like the "conferencing" codec mentioned previously, this videophone codec modifies the H.263 bitstream by selectively adding AVQ vector quantization to the standard scalar H.263 quantization scheme. However, the bit rate control provided by this videophone codec improves the resolution of whatever channel is available, ISDN or PSTN, by improving rate-control and coding efficiency. The efficient use of the available channel capacity is assured by accurately calculating actual bit rates and, thus, maximizing the number of bits available for luminance and chrominance coding. It also improves the responsiveness of ISDN codecs by expediting the rate control process.

In FIG. 1, skin-color is identified with the chrominance of a flat-luminance area within an elliptical facial contour. The elliptical facial contour is preferably detected by the correlation between a ternary-valued template $T_x$, containing a weighted representation of an elliptical geometric model of an elliptical face-edge contour $P_x$, and a map of edges detected in the luminance of the image frame 22. Specifically, the luminance edges 22 in a frame 10 are tested to find a best-fit location for the best-fitting template in a set of ellipse templates $T_x$.

The templates used are preferably the dithered, dual-contour ternary-value templates $T_x$ disclosed in detail in the commonly-assigned copending U.S. patent application, Ser. No. 08/775,906, filed Jan. 2, 1997 now U.S. Pat. No. 5,822,115 and incorporated herein by reference. These ternary templates implement a rapid and robust two-step facial ellipse location search illustrated by elements 50a–50d and elements 52a and 52b in FIG. 1 using an array processor for batch processing of image data arrays using sum-and-absolute-difference (SAD) computations.

The first search for a best fit is limited to macroblocks that were identified as part of the skin-colored "facial" region in the previous frame. If the correlation found in this local search is not a good enough to exceed a first threshold Th 1 in a correlation threshold test 54a, a correlation that exceeds a second test 54b, using a lower threshold Th 2, is sought globally in the entire luminance of the frame. If the lower threshold Th 2 is also not satisfied by the best fit found in the global search, parameters identifying the location providing the best fit in the last frame are reused as the facial ellipse area for implementing skin-color tracking operations 42 in the present frame.

In videophone applications, these two searches are preferably limited to objects in the foreground of the image by an object mask routine 20 that precedes the searches. The object mask routine 20 zeroes out areas where edges have moved less than a predetermined amount from the previous frame, to simplify the head-and-shoulders videophone images. This routine could also be used to eliminate moving backgrounds in special-purpose video applications. In either case, this simplification of the spatio-temporal complexity of an image increases the robustness of the tracking processes that define the semantics of the video image.

Similarly, for images produced by portable video units or units equipped with zoom options, a further Global Motion Estimation (GME) simplification operation may be used to stabilize the image frames. GME provides knowledge-based intertemporal stabilization of image coordinates using the edge-motion values produced by H.263 codecs for identifying objects located in a relatively stable area as the "foreground" in the image frame.

Once a best-fit facial ellipse is located in the frame, all objects in the frame 10 having the same over-all chrominance as the largest flat-luminance area located within that facial ellipse are identified as part of the facial region of that frame. Specifically, skin-color is determined as chrominance values within a given range of the chrominance values for an area of the image frame wherein the AC energy in the luminance DCT values of 2×2 pixel blocks is below an empirically-determined threshold $T_{EN}$.

This flat-luminance requirement avoids inclusion of hair, eyebrows, etc. in the skin-color determination, and a single peak chrominance value usually appears in the $C_b$ and $C_r$ intensity histograms for these flat-luminance areas. The skin-color chrominance range for each image frame is then determined statistically as one standard deviation above and below the mean value of the chrominance histogram, or by a suitable heuristic algorithm using the peak value data.

Parameters identifying all macroblocks centered within that facial region are then supplied to a luma prefilter 31, along with vector data for that frame. When the face is tilted or rotated so far that a facial ellipse can no longer be detected, the facial-region location parameters from the previous frame 40 are reused until facial-ellipse tracking is successful again, to help preserve local consistency in image quantization.

The luma prefilter 31 differentially filters the pixels of the image frame 17 after the video image frame 10 provided by the incoming signal 12 has been reduced to a convenient 8×8pixel array such as by converting to a CIF format (block 14), adjusting dimensions (block 15) and decimating (block 16). An object-oriented prefilter having semantically-defined spatially-variable intensity is used to prepare each image frame for DCT-coding operations, in place of conventional low-pass filters, such as the filter 18 used with an edge coding routine 19 and the object mask routine 20 in preparing the foreground edge map 22 from each image frame 10.

Semantically-varying prefiltering intensity improves coding efficiency, as does filtering using conventional low-pass filters, but avoids the clumsy de-emphasis of perceptually important areas that occurs because of their fixed attenuation level. Similarly, the facial regions may also be differentially processed by a postfilter 38 in the decoder, so as to assure that image resolution is preserved.

Preferably the prefilter 31 is a linear 3×3 non-separable FIR filter having a semantically-variable attenuation level N. The strength of the filtering applied by the FIR filter to each pixel, expressed as 1/N, is different for each of seven categories of pixels.

Background pixels are filtered most. These are pixels which are not in or on the edge of any of the three types of extracted regions: facial-ellipse regions, skin-color regions and moving-edge regions, in order of increasing filter intensity. Also, pixels in an extracted region are filtered less than those on its edge. Moving-edge regions in a given H.263 frame are the macroblocks in that frame which have a non-zero motion vector. When more than one category is applicable to a pixel, the category producing the least filtering is applied to that pixel.

Frame Initialization

After this semantic prefiltering 31, the frame's data is initialized for the iterative calculation of its bit rate. With reference now to FIG. 2, each H.263 video frame that is vector-coded and processed by the prefilter 31 is either coded in conformance with the H.263 recommended format or, preferably, using finer, non-standard gradations among its quantizers than are available from the standard set of quantizers.

Figure 5A:
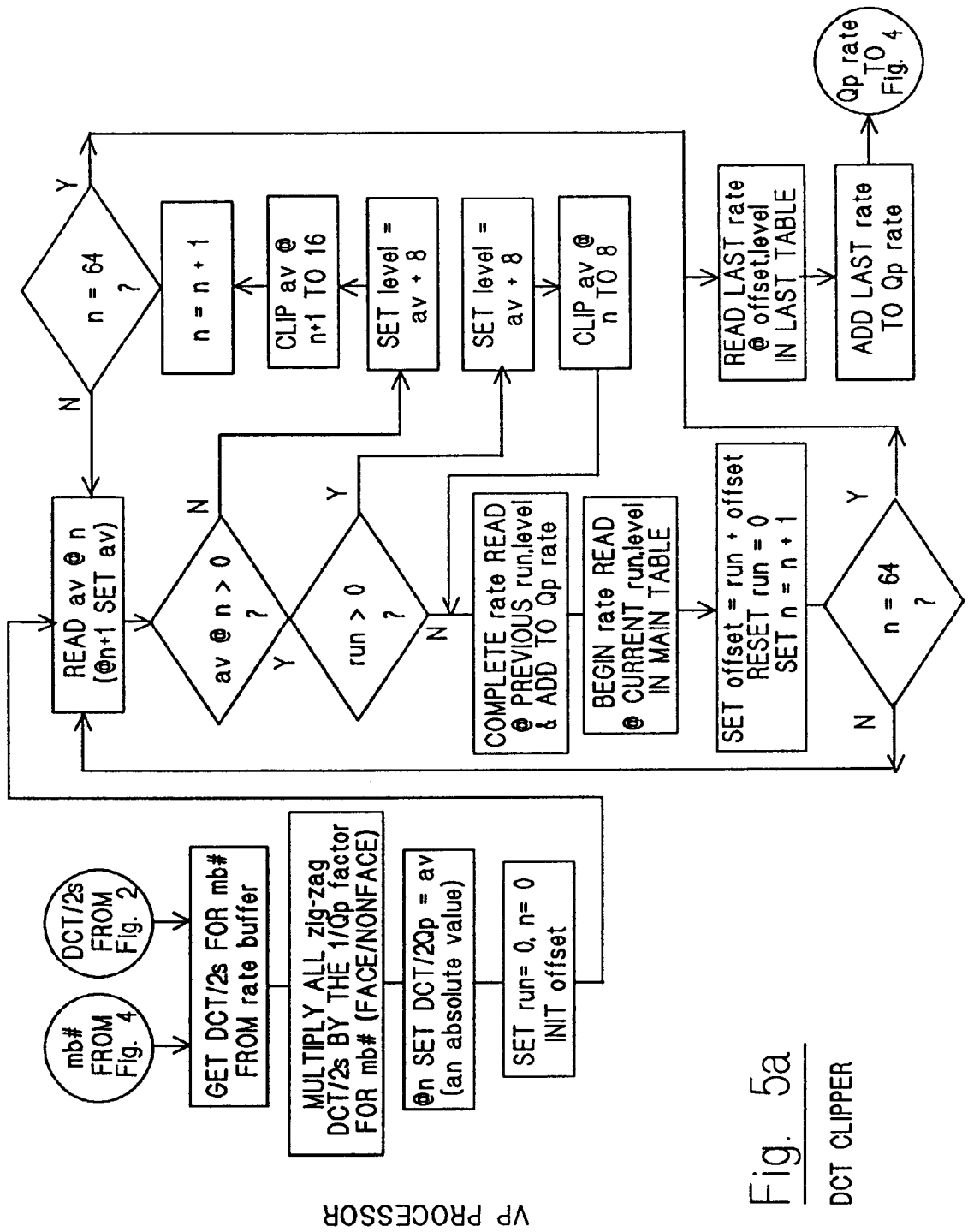
FIG. 5a is a block diagram showing the DCT clipping operation used to expedite the bit rate calculation for RLA tokens.

Arrays of $Q_p$ quantizer values for each type of region and an inverse $1/Q_p$ "$Q_p$ factor" for each quantizer are initialized for each frame, and reused by the rate control loop. One half of the DCT coefficients is also calculated once by the pre-quantize operation 33, and reused in the iterative optimization of $Q_p$ values for the line containing that block, as shown in FIG. 5a. The resulting array of prequantized values, and a maximum DCT value for the array, are then stored and reread in each iteration of the iterative bit-rate determination process.

The largest DCT coefficient in each macroblock is used to test for, and mark, zero-rate macroblocks before the iterative $Q_p$ rate calculation is attempted. By-passing blocks where the largest coefficient in the block DCTmax is smaller than the quantizer value $Q_p$ being used in that block, frees up time for the greater number of rate-control iterations needed to code the blocks having fine facial detail.

Blocks that are bypassed in the scalar-coding process have a $Q_p$ rate of zero, by definition and, therefore, no iterative calculation is necessary. In particular, fine detail is very important in simple scenes, and minimal $Q_p$ quantizer values preserve this detail. However, these minimal $Q_p$ values require many iterations of the line-control calculation. Many other macroblocks in these same image frames are likely to have very low DCT coefficients in their constituent luma and chroma blocks.

Rate assist 32 provides a reduction in the frequency of H.263 8×8 motion vector coding. Specifically, since H.263 disallows use of 8×8 motion vectors in conjunction with DQUANTS, rate assist 32 turns off 8×8 motion vectors in macro blocks which may be assigned a DQUANT in the iterative loop. These macroblocks lie at the boundary between the foreground and background regions.

This zero-rate block-bypass DCTmax value and the prequantized pixel-value array initialized by the pre-quantize operation 33, and the array-processing of actual quantization bit rates in the line-control operation 34a, expedite the entire bit rate determination so that the speed of the general-purpose central processor that controls the bit rate calculations is less critical. Thus, real-time actual bit-rate calculations can be controlled using a less expensive central processor and coding and buffering of the macroblocks can be accomplished by code generator 36 and output buffer 37, respectively .

Specifically, pre-quantize 33 calculates and halves the H.263 coefficient values for each frame using a high-speed Vision Processor (VP) array co-processor. Preferably, the central processor is a video compression processor (VCP) made by Integrated Information Technology, Inc. The VCP provides eight bits for each pixel value and contains a "MIPS-X" central processor that acts as the controller for other parts of the VCP: a Huffman encode/decode unit, the video input/output signal- conditioning units, and a very powerful, dedicated Vision Processor (VP) array coprocessor.

The VP coprocessor runs assembly-language programmed subroutines stored in local RAM. Special-purpose VP routines are resident in ROM, for the sake of efficiency. The VP has two 1-kilobyte internal memories: DM and DP and a RISC-type core-function section that operates in parallel with the array-function section that provides four multiply-accumulate actions per instruction cycle.

In the prequantization shown in FIG. 2, the VP routine fdct calculates the forward DCT values for the pixels in each macroblock using the DCT code stored in the VP unit's ROM. The VP routine interpq first performs the division by two. Then, the absmax instruction, used in a tree decomposition, retains the largest magnitude coefficient DCTmax in a register, whether positive or negative. The macz instruction is then used to compute the absolute value of DCTmax.

In addition to initializing operations that streamline the rate-control loop by precalculating and reusing frame values in the line-control loop whenever possible, various process control flags and constants are set each time a frame is initialized. An initstate flag is set to "TRUE" for the first rate calculation for each frame, to assure that all lines in the frame are processed during the first pass. Thereafter it is reset and rate calculation can end after any subsequent line in the frame.

The sets of quantization-control values DQ, $Q_p$ and their indexes I☐ are defined and initialized for the f and b regions in each frame. This finite set of quantizers for each frame, and the unidirectional sequence in which they are selected for evaluation in the line-by-line iterative rate-control calculation guarantees that no more than M iterations will be needed. Where there are Y lines and 2 types of regions in that frame and $Q_p\#$ is the number of quantizer values $Q_p$ available in that frame, then $M_{fr\#}=2YQ_p\#$. In most cases, fewer than $M_{fr\#}$ iterations will be required in that frame.

State character and regptr variables are initialized to indicate the type of region being calculated and which quantizer is used. The qp variable stores the $Q_p$ factor quantization value currently being used in FIG. 5a to calculate the quantized-pixel bit rate $Q_p$ rate. The actrate variable stores the current bit rate for the frame being evaluated. The otherrate variable stores actrate+MVBIT#+OHBIT# for use in the frame-control operation.

The variable os points to the next 8×8block, at 0 or 64, enabling the VP to store one block while evaluating a previously-stored block. The ratebuffptrs initialized in FIG. 2 indicate the beginning of the DCT/2 pixel values for each type of H.263 block stored in the "rate buffer" area of memory for the frame: three y luminance blocks, and u and v chrominance blocks for each H.263 macroblock. The dimensions X and Y of the current frame are also stored there.

Line Control

With reference now to FIG. 3, line-by-line bit rate calculation and quantizer adjustment begins by calculating a target value for the quantization of particular frame being evaluated. The target is like the bit budget used for hybrid AVQ, in that it basically is the channel capacity divided by the video frame rate. However, unlike the bit budget, this bit-rate variable includes both vector and scalar data bits, including quantization data, but not motion vectors and not housekeeping data that is image-data independent. The pointers to largest $Q_p$ values in the $Q_b$ and $Q_f$ array registers and block position pointers x, y are also initialized.

After all blocks in all X macroblocks mb# in a line have been evaluated, the actrate is compared to target. If actrate is less than the target, the bit rate R for the current line becomes oldrate and the line-evaluation loop is repeated, unless the complete frame has been evaluated. If actrate exceeds target the frame is referred to the "frame control" operation, unless the initstate flag value is TRUE.

If frame control 34b does not intervene, the initstate flag is set to FALSE and the quantizer value for one of the regions of the current frame f# is adjusted by line control 34a, once an entire frame of Y lines has been evaluated. A convenient, operator-selected threshold level Th is used to emphasize detail in the skin-colored facial regions.

Preferably, the Th value is a value from among the fifth through eighth largest DQUANTs of the sixteen DQUANTs used in the non-standard operating mode. In this way, the quantizers $Q_p$ used in the facial region will be adjusted downward, to the [i+1] member of the $Q_f\square$ array, more often than they would with a lower Th, so that finer quantization is supplied to facial regions of that particular frame f#.

The rate R for each quantized line y is computed as shown in FIG. 4a for each pair of quantizers used. Preferably, only macroblocks mb# in a region where the quantizer value $Q_p$ has changed are recomputed after the actrate has been computed once for the entire frame.

In FIG. 4a, the bits R required in each block k# of each H.263 macroblock mb# for hybrid AVQ vector coding and scalar coding is tallied using H.263 CBPY and MCBPC lookup tables, except for the $Q_p$ rate bits used for quantized values, which are computed in FIG. 5a. However, these standard tables are reorganized and orthogonally re-indexed for rapid access by binary index values made up of the arrays of binary status flags shown in FIGS. 4b and 4c.

The yindex shows which luma blocks are scalar-coded. The cindex shows whether the inter4v flag is set to indicate the presence of four motion vectors, whether the mb# is an H.263 interframe macroblock, whether there is a DQUANT value for the macroblock and, finally, whether each of the two chroma blocks is scalar-coded.

The current $Q_p$ value being evaluated is checked against the stored DCTmax value each time the scalar-coding bit rate for another k# block is calculated, bypassing both coding and rate calculation for blocks that have a zero-rate for the current $Q_p$ value, as described above. Fine detail is likely to be very important in simple scenes but many other macroblocks are likely to be virtually blank in such scenes, having very low DCT coefficients and a zero bit rate during early iterations of the rate calculation when the larger $Q_p$ values are used to quantize these DCT coefficients. Rate calculation, as well as zigzag RLA entropy coding can bypass any block where quantization produces a zero amplitude, as happens wherever the DCT coefficient is smaller than the quanfizer value $Q_p$. The bit rate of such blocks is zero, by definition. This bypass frees up time for the rate-control iterations.

Figures 5B, 5C, 5D:
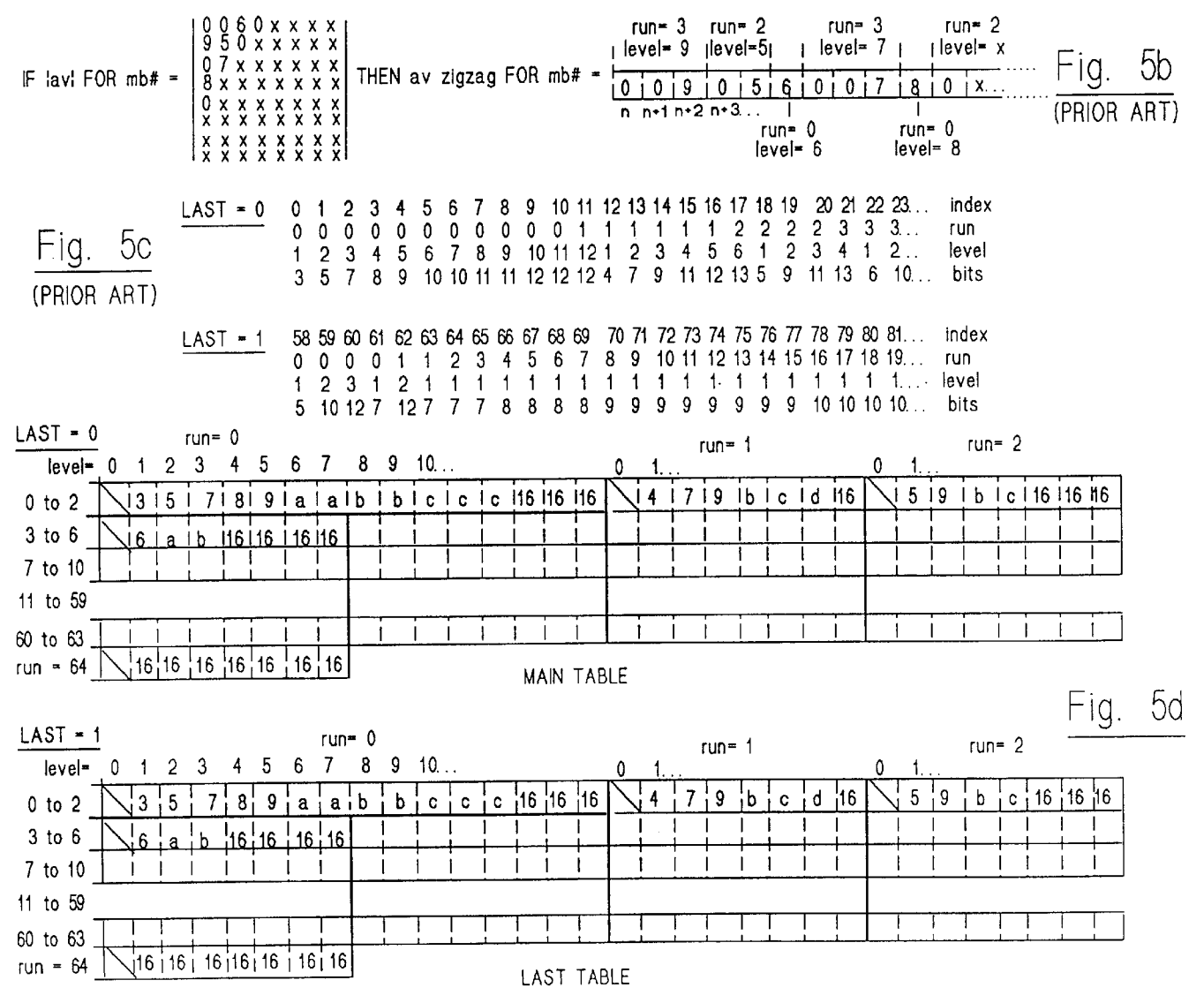

The DCT coefficients in each scalar-coded block are also clipped, as shown in FIG. 5a, to provide a block-indexed RLA coding operation that is much faster, but numerically precisely the same as look-ups using the H.263 table-indexing scheme. As shown in FIG. 5b, each 8×8pixel block is converted to a zigzag array of the absolute quantized DCT pixel values. That array of absolute values is then RLA encoded as a sequence of (run, level) value pairs. Each such pair has a given bit rate "bits" given for it in the H.263 standard but, as shown in FIG. 5c, the number of entries for each run length varies and access to the bit rates is sequential.

A two-part block-indexed RLA bit-rate table in accordance with the preferred embodiment of the present invention is shown in FIG. 5d. The second part, the LAST TABLE, is separated in memory from the MAIN TABLE by a given distance offset, and so, block-indexed at run+offset rather than run. For improved efficiency, the av level-clipping and absolute value av determinations operate in parallel with each other and with the table look-up of the hexadecimal bit rate value for a previously determined (run, level) pair of RLA values. As each av pixel value is read at a location n in the zigzag array in FIG. 5b and clipped as shown in FIG. 5a, the av value is also determined for the pixel value at location n+1 shown in FIG. 5b and the bit rate for the (run, level) pair of RLA values for pixels located at n−x is also read from the table shown in FIG. 5d.

Once all sixty-four values in the zigzag array for an 8×8block have been looked up, an additional bit rate value is looked up in the LAST TABLE for the last (run, level) pair, using the offset value as an index adjustment, as explained above. A cumulative $Q_p$ rate value is then passed back from the VP processor to the MIPS-X central processor's rate calculation shown in FIG. 4a, for inclusion in its current bit rate R.

Frame control, shown in FIGS. 1 and 3 is entered and ends the iterative calculation only after initstate is reset to FALSE and either $Q_b$ has been adjusted down to the minimum $Q_p$ value made available to that frame f# in FIG. 2, or actrate exceeds target. Preferably, for precise bit allocation in a 7.5 fps video signal compressed by a factor of 4 from a 30 fps video signal, the integer quotient of 4 times actrate+MVBIT#+OHBIT# divided by target+MVBIT#+OHBIT# determines the f# of the next frame to be evaluated by the rate control operation.

If that integer quotient is less than "4", no frames at the 7.5 fps rate will skipped. However, frames may be added to the nominal 7.5 fps rate, increasing the effective resolution of the video channel, especially where $Q_b$ has reached its minimum $Q_p$ value so that it cannot be reduced further.

The invention has been described with particular reference to a presently-preferred embodiment thereof. However, it will be immediately apparent to one skilled in the art that variations and modifications are possible within the spirit and scope of this invention. For example, the present invention is also applicable to bit rate control for other types of real-time encoding operations. The invention is defined by the claims appended below.

What is claimed is:

1. Apparatus for line-by-line feed forward bit-rate control of a differentially quantized signal representing a frame having an array of blocks, said frame having a given number of lines and given number of blocks in each line, each of said blocks having a data value and being in a region, each region having a respective set of available quantizer values for use in quantizing said data value in a block, said apparatus comprising:

bit-rate calculating means for iteratively determining a bit rate for each block in each line in the frame;

bit-rate control means for determining when the calculated bit rate for the frame exceeds a given target rate;

quantizer adjustment means for reducing the quantizer for one region in a next line when the calculated bit rate for the frame does not exceed said given target rate;

rate-assist means for reducing four motion vectors to one in edge blocks of the one region that follow blocks in another region and forcing coding of a respective quantizer change value; and a bypass path for bypassing said bit rate calculation means for preventing determination of a bit rate for a block where a respective maximum value in each block is not greater than the respective quantizer value used in a given iteration for quantizing the data value in said block.

2. The apparatus of claim 1, further comprising a prequantizer, said prequantizer calculating and storing the data value of each block for reuse in each iteration of said bit rate calculating means.

3. The apparatus of claim 1, further comprising flag-array indexed Coded Block Patterns for Luminance (CBPY) and Macroblock Coded Block Patterns for Chrominance (MCBPC) bit rate tables, said flag-array indexed tables providing bit-rate data for said bit-rate-calculating means.

4. The apparatus of claim 1, further comprising a block-indexed Run Length Amplitude (RLA) bit rate table, said block-indexed RLA table providing bit rate data for said bit-rate-calculating means.

5. The apparatus of claim 4, further comprising an RLA amplitude clipper for access to a compressed block-indexed RLA bit rate table.

6. The apparatus of claim 5, further comprising a first clipper for clipping the amplitudes of zero-valued RLA run values to one value and a second clipper for clipping non-zero-valued RLA run values to another value.

7. A method for line-by-line feed forward bit-rate control of a differentially quantized signal representing an array of blocks, said array having a given number of lines and given number of blocks in each line, each of said blocks being in a region, each region having a respective set of available quantizer values for quantizing data values in said blocks, said method comprising the steps of:

iteratively determining a bit rate for each block in each line in a frame;

determining when the calculated bit rate for the frame exceeds a given target rate;

reducing the quantizer for one region in a next line when the calculated bit rate for the frame does not exceed said given target rate;

reducing four motion vectors to one in edge blocks of the one region that follow blocks in another region and forcing coding of a respective quantizer change value;

bypassing the computation of a bit rate for a block where a respective maximum value in each block is not greater than the respective quantizer value used in a given iteration for quantizing the data value in said block.

8. The method of claim 7, further comprising a prequantization step for calculating and storing the data value of each block for reuse in each iteration of said bit rate determining step.

9. The method of claim 7, further comprising the step of flag-array indexing Coded Block Patterns for Luminance (CBPY) and Macroblock Coded Block Patterns for Chrominance (MCBPC) bit-rate tables during an iteration of said bit rate iteratively determining step.

10. The method of claim 7, further comprising the step of block-indexing a Run Length Amplitude (RLA) bit-rate table during an iteration of said bit rate iteratively determining step.

11. The method of claim 10, further comprising the step of clipping an RLA amplitude for use in block indexing a compressed block-indexed RLA bit rate table.

12. The method of claim 11, further comprising the steps of clipping the amplitudes of zero-valued RLA run values to one value and a second clipper for clipping non-zero-valued RLA run values to another value.

* * * * *